United States Patent [19]
Aukzemas

[11] Patent Number: 5,941,669
[45] Date of Patent: Aug. 24, 1999

[54] JACK-OUT CAPTIVATED SCREW

[75] Inventor: Thomas V. Aukzemas, Wilmington, Del.

[73] Assignee: Southco, Inc., Concordville, Pa.

[21] Appl. No.: 09/099,542

[22] Filed: Jun. 18, 1998

[51] Int. Cl.⁶ ................................................ F16B 39/00
[52] U.S. Cl. ............................ 411/107; 411/353; 411/999
[58] Field of Search ..................... 411/352, 353, 411/107, 180, 965, 969, 999

[56] References Cited

U.S. PATENT DOCUMENTS

| | | | |
|---|---|---|---|
| 2,376,089 | 5/1945 | Savageau | 411/999 |
| 3,062,253 | 11/1962 | Millheiser | 411/999 |
| 3,502,130 | 3/1970 | Gulistan | |
| 3,639,971 | 2/1972 | Gulistan | |
| 3,746,067 | 7/1973 | Gulistan | |
| 4,174,008 | 11/1979 | Preziosi | 411/353 |
| 4,212,224 | 7/1980 | Bragg, Jr. et al. | |
| 4,878,795 | 11/1989 | Woodrow | 411/353 |
| 4,930,959 | 6/1990 | Jagelid | 411/107 |
| 4,952,107 | 8/1990 | Dupree | 411/107 |

OTHER PUBLICATIONS

Southco, Inc. captive Screw assembly, 1992.
Fastener Technology Corp., Jack Screw, 1987.
Asmco, Hex Jack Screw, part number 67664.
RAF Electronic Hardware Brochure, Seymour, CT 06483, ³⁄₁₆ Hex Jack Screws.

*Primary Examiner*—Flemming Saether
*Attorney, Agent, or Firm*—Paul & Paul

[57] ABSTRACT

A jack-out screw for attaching a first panel to a second panel when rotating the screw in a first direction and which provides a force in the axial direction of the screw with respect to the panel when the screw is rotated in the opposite direction to pry the first panel away from the second panel during rotation, including a screw and a housing where the upper surface of the housing is mountable flush with the panel on which the jacking screw is installed and an interface for securing the screw head to the housing allows for rotational movement of the screw along its axis, but does not allow for substantial axial movement of the screw with respect to the housing.

14 Claims, 3 Drawing Sheets

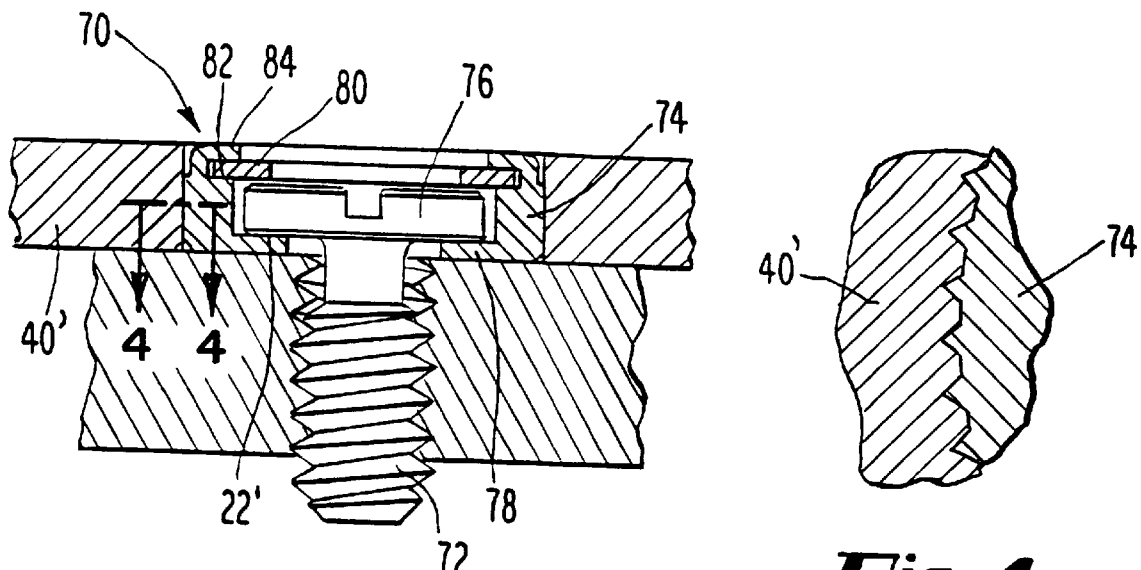
Fig. 3
Fig. 4
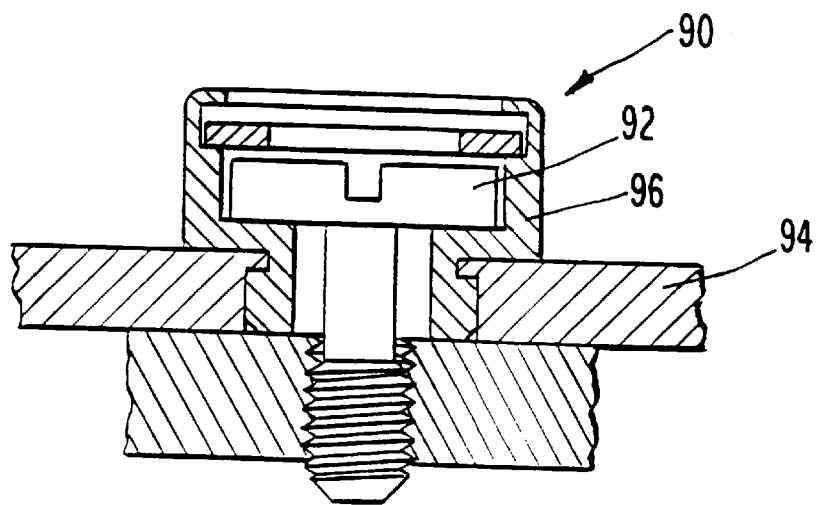
Fig. 5 (PRIOR ART)

JACK-OUT CAPTIVATED SCREW

BACKGROUND OF THE INVENTION

This invention relates to fasteners in general. More particularly, this invention relates to fasteners of the type used to secure panels or modules to a receiving frame or housing that requires the panel or module to be jacked out by a screw known as a "jack-out screw."

Many applications exist for this type of jack-out screw. For example, it may be advantageous to use jack-out screws on a printed circuit board assembly that is mounted within a housing. If that printed circuit board assembly is plugged into a connector where there is a substantial amount of force required to extract the board from the connectors, the use of one or more jack-out screws may be desirable.

Some prior art jacking screws use a retainer ring on the screw shaft to captivate the screw in the housing which is mounted on a first panel. This retainer ring may separate and cause the jacking screw to uncouple or otherwise come apart during the jacking operation. Prior jacking screws also are not mounted flush with the top surface of the panel on which the jacking screw is retained. The present invention combines flush mounting with a means to mount the screw in a housing that does not use a shaft mounted retainer ring, providing a superior jacking screw.

SUMMARY OF THE INVENTION

The present invention provides a captive jacking screw for attaching a first panel to a second panel. The captive jacking screw further enables the two panels to be compelled together or apart as the captive jacking screw is rotated. The captive jacking screw mounts on the first panel and is screwed into a threaded hole in the second panel.

The captive jacking screw is for attaching a first panel to a second panel when rotating the screw in a first direction and which provides a force in the axial direction of the screw with respect to the panel when the screw is rotated in the opposite direction to pry the first panel away from the second panel during rotation. The jacking screw includes a screw and a housing where the upper surface of the housing is mountable flush with the panel on which the jacking screw is installed and an interface for securing the screw head to the housing allows for rotational movement of the screw along its axis, but does not allow for substantial axial movement of the screw with respect to the housing.

It is therefore an object of the present invention to provide a jacking screw that does not use a retainer ring which may cause the jacking screw to come apart during the jacking operation.

It is another object of the present invention to provide a jacking screw that retains the screw in its housing at a location remote from the threads of the screw.

It is a further object of the present invention to provide a captive screw that does not protrude above the surface of the panel on which it is installed.

Other objects and advantages of the present invention will become apparent from the following description taken in conjunction with the accompanying drawings.

BRIEF DESCRIPTION OF THE DRAWINGS

FIG. 3 is a front view of a second embodiment of a jack-out captivated screw of the present invention.

FIG. 4 is a partial cutaway view of the captive screw of FIG. 3, taken along line 4—4 of FIG. 3.

FIG. 5 is a front view of a prior art jack-out captivated screw of the present invention.

DESCRIPTION OF THE PREFERRED EMBODIMENT

Figure 1:
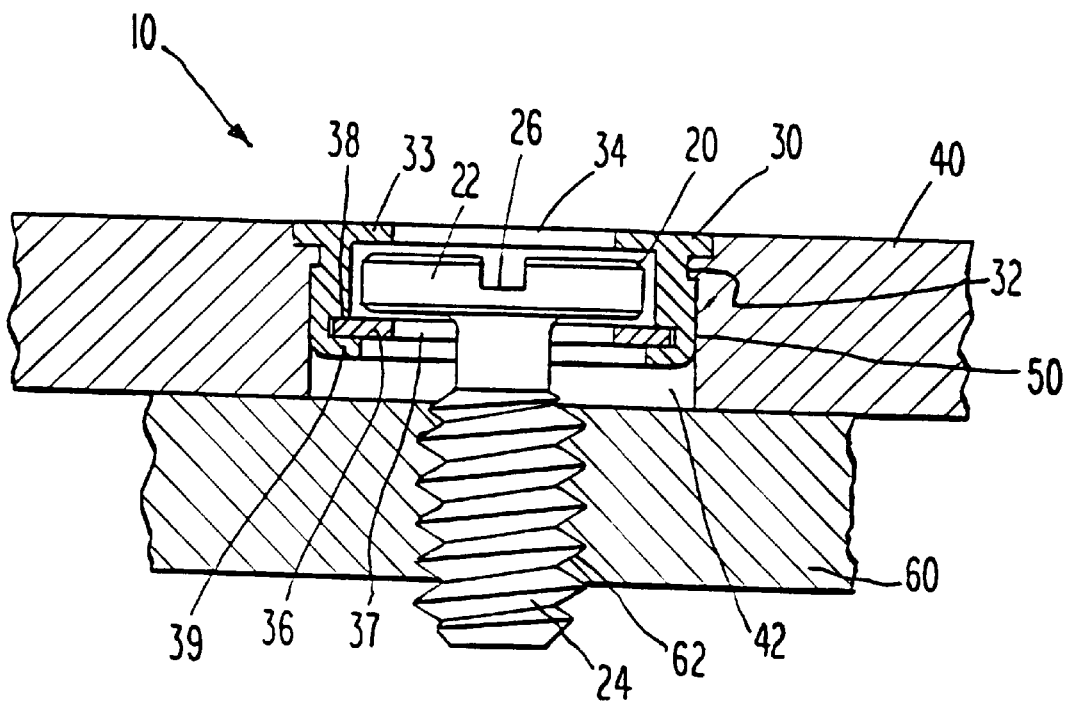
FIG. 1 is a front view of a jack-out captivated screw comprising a preferred embodiment of the present invention as installed on a first panel and screwed into a second panel.
Figure 2:
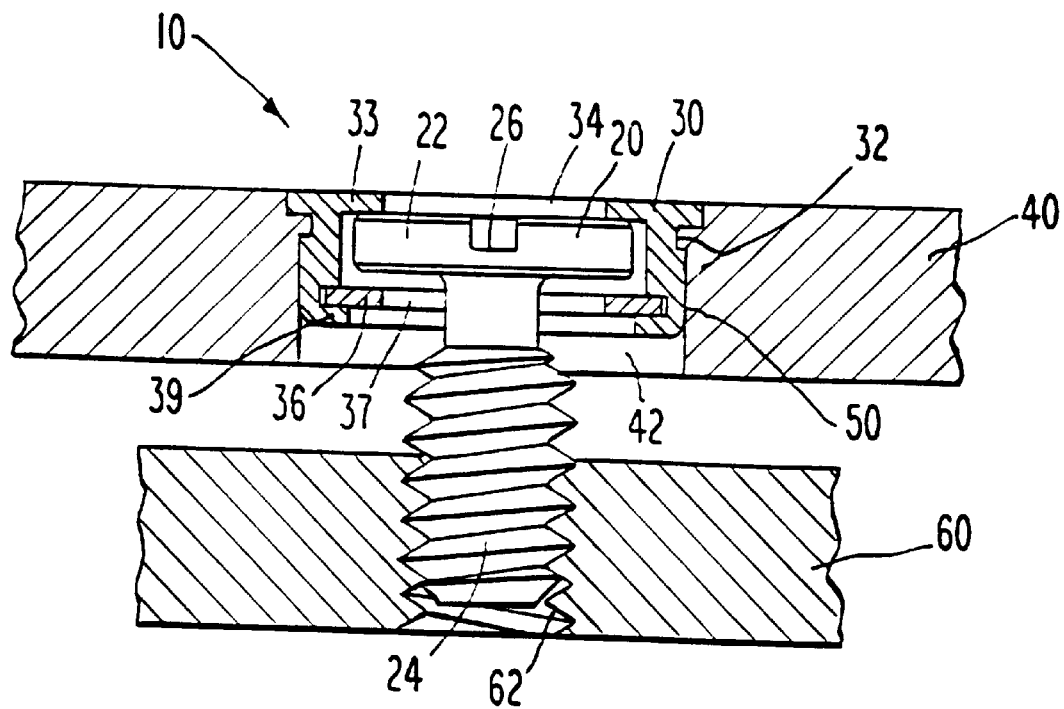
FIG. 2 is a front view of the jack-out captivated screw of FIG. 1 as installed on a first panel midway through jack-out from a second panel.

Referring now in detail to the drawings, wherein like reference numerals indicate like elements throughout the several views, there is shown in FIGS. 1 and 2, a captive jacking screw 10 in accordance with one preferred embodiment of the present invention. The illustrative captive jacking screw 10 is shown generally comprising a screw 20 having a head 22 and a threaded shaft 24, a housing 30 that is mountable to a first panel 40, and a means to retain 50 the screw head 22 within the housing 30, while allowing for rotational movement of the screw 20 within the housing 30.

As can be seen in FIGS. 1 and 2, the screw 20 is held in place within the housing 30 such that it is free to rotate in the axial direction, however, the screw 20 is held in place within the housing 30 in the longitudinal direction by the screw retention means 50. As seen in the preferred embodiment of FIGS. 1 and 2, the screw retention means 50 includes means above and below the screw head 22 to captivate the screw head 22 in the housing 30.

At the top of housing 30 is aperture 34 such that a screw driver recess 26 in screw 20 is accessible. The aperture 34 is formed by the upper part of the screw retention means 50 which includes an annular surface 33 on the housing 30 to capture the top of the screw head 22. The screw retention means further includes a washer 36 having a clearance hole 37 which allows the threaded shaft 24 to pass through the clearance hole 37. The washer 36 is held in place within housing 30 on annular ledge 38 of housing 30. The washer 36 is placed down on annular ledge 38 and the lower edge 39 of the housing 30 is rolled over the washer 36 to secure the washer 36 and therefore the screw 20 in place.

Figure 1A:
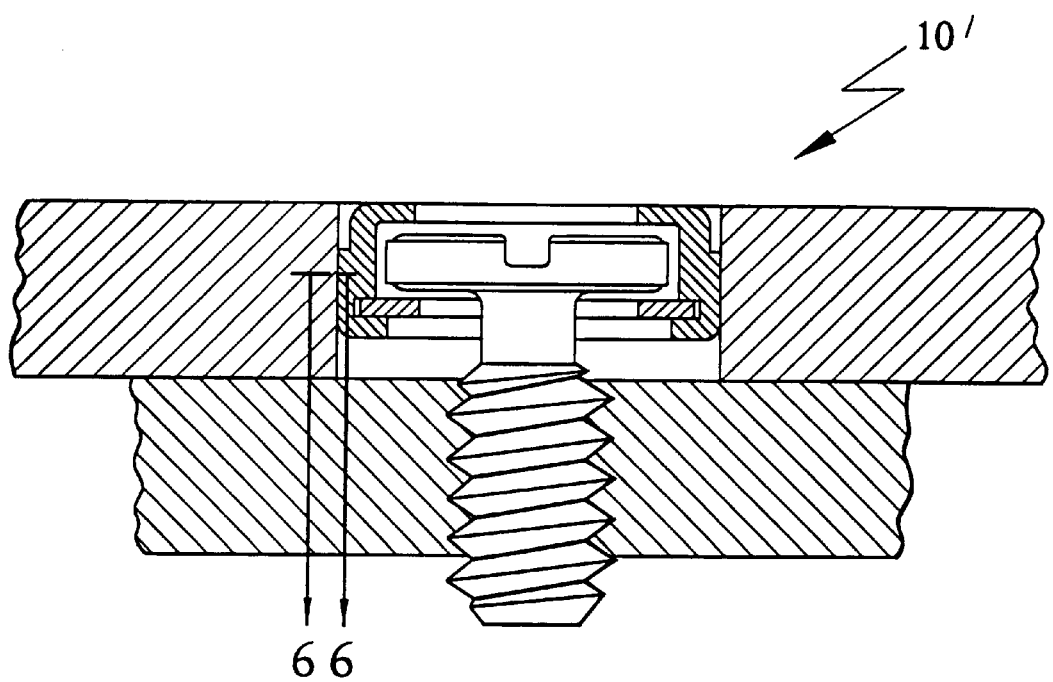
FIG. 1A is an front view of the jack-out screw of FIG. 1 having an alternate press-in style housing.
Figure 6:
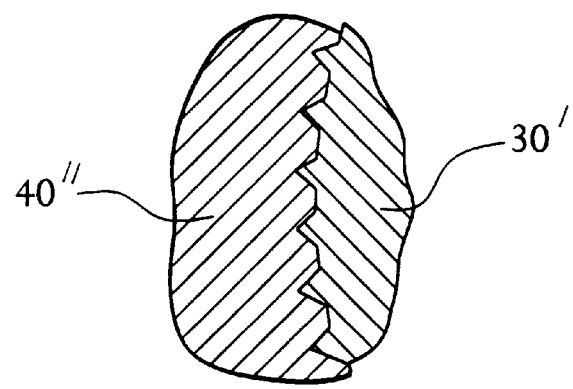
FIG. 6 is a partial cutaway view of the captive screw of FIG. 1A, taken along line 6—6 of FIG. 1A.

The housing 30 is rigidly secured to the first panel 40 by a panel retention means. For example, as depicted in FIGS. 1 and 2, the housing 30 may be held in place by an press fit where the housing 30 is pressed into place in a hole 42 in panel 40 such that panel material flows into groove 32 of housing 30. FIGS. 1A and 6 depict an alternate panel retention means having knurls to facilitate captivation by pressing in, as known in the captive hardware art.

Thus, the housing 30 is retained on panel 40 and the screw 20 is retained within the housing 30. The screw 20 is free to rotate axially, but as the screw 20 is screwed into a second panel 60 having a threaded hole 62, the first panel 40 is lowered or raised as the screw 20 of the captive jacking screw 10 is rotated clockwise or counterclockwise respectively. FIG. 1 depicts the captive jacking screw 10 as mounted on a first panel 40 fully secured to a threaded hole 62 in a second panel 60.

FIG. 3 depicts an alternate embodiment of the captive jacking screw of the present invention. FIG. 3 shows a captive jacking screw 70 of a press-in style, but the screw 72 is installed in housing 74 from the top side of housing 74 rather than the bottom side of the housing 74 as seen in FIG. 1. Here, the bottom surface of the screw head 76 sits on flat annular surface 78 of housing 74. Washer 80 is then placed on annular ledge 82 of housing 74 and the top 84 of the housing 74 is rolled over to secure the washer 80 and thereby the screw 72 in place to the housing 74, while allowing for rotational movement of the screw 72 with respect to the housing 74.

FIGS. 3 and 4 also depict an alternate press fit connection between the housing 74 and the panel 40'. As shown in FIG. 4, the outer surface of the housing 74 is preferably knurled and is of a greater diameter than the hole in the housing 74 such that there is an interference fit when the housing 74 is pressed into place in panel 40'.

FIG. 5 depicts a prior art captive screw 90 of the present invention where the screw head 92 sits above the surface of the first panel 94. The housing 96 is press fit into a hole in a first panel by a panel retention means known in the art. This assembly is otherwise similar in function to that of the embodiment of FIG. 3. This prior art does not offer the advantage of being flush with the surface of the panel.

Of course, any type of screw driver recess would likely work adequately for the present jack-out screw, including Phillips, Torx, slotted, and the like.

It will be recognized by those skilled in the art that changes may be made in the above described embodiments of the invention without departing from the broad inventive concepts thereof. It is understood, therefore, that this invention is not limited to the particular embodiments disclosed, but is intended to cover all modifications which are within the scope and spirit of the invention as defined by the appended claims.

I claim:

1. A jack-out screw attached to a first panel for attaching the first panel to a second panel when rotating the screw in a first direction and which provides a force in the axial direction of the screw with respect to the panel when the screw is rotated in the opposite direction to pry the first panel away from the second panel during rotation, comprising:
    (a) a screw having a threaded shaft and a head, said head having a top side and a bottom side; and
    (b) a housing comprising:
        (i) an upper surface and a perimeter edge surface, said upper surface flush with the first panel on which the jacking screw is installed;
        (ii) a press-in panel retention means for securing the housing to the first panel where; and
        (iii) a screw retention means for securing the screw head to the housing that allows for rotational movement of the screw along its axis, but does not allow for substantial axial movement of the screw with respect to the housing, said screw retention means comprising an upper annular surface in said housing and a lower annular surface in said housing and said screw head captured therebetween.

2. The jack-out screw and panel of claim 1, where the press-in panel attachment means includes an annular groove around the perimeter edge surface of the housing.

3. The jack-out screw and panel of claim 1, where the press-in panel attachment means includes knurling around the perimeter edge surface of the housing.

4. The jack-out screw and panel of claim 1, where the housing installs from the top of the panel.

5. A jack-out screw attached to a first panel, for attaching the first panel to a second panel when rotating the screw in a first direction and which provides a force in the axial direction of the screw with respect to the panel when the screw is rotated in the opposite direction to pry the first panel away from the second panel during rotation, comprising:
    (a) a screw having a threaded shaft and a head, said head having a top side and a bottom side; and
    (b) a housing, comprising:
        (i) an upper surface and a perimeter edge surface, said upper surface flush with the first panel on which the jacking screw is installed,
        (ii) a panel retention means for securing the housing to the first panel; and
        (iii) a screw retention means for securing the screw head to the housing that allows for rotational movement of the screw along its axis, but does not allow for substantial axial movement of the screw with respect to the housing, comprising a first and a second annular surface on the housing and a washer, where the top of the screw head is retained against the first annular surface on the housing, the washer is secured to the second annular surface on the housing by a rolled over section of the housing, and the screw head is sandwiched therebetween.

6. The jack-out screw and panel of claim 5, where the panel retention means for securing the housing to the first panel is a press-in attachment means.

7. The jack-out screw and panel of claim 5, where the press-in panel attachment means includes an annular groove around the perimeter edge surface of the housing.

8. The jack-out screw and panel of claim 5, where the press-in panel attachment means includes knurling around the perimeter edge surface of the housing.

9. The jack-out screw and panel of claim 5, where the housing installs from the top of the panel.

10. A jack-out screw attached to a first panel for attaching the first panel to a second panel when rotating the screw in a first direction and which provides a force in the axial direction of the screw when the screw is rotated in the opposite direction to pry the first panel away from the second panel during rotation, comprising:
    (a) a screw having a threaded shaft and a head, said head having a top side and a bottom side,
    (b) a housing having an upper end and a lower end, comprising:
        (i) an upper surface and a perimeter edge surface, said upper surface flush with the first panel on which the jacking screw is installed;
        (ii) a panel retention means for securing the housing to the first panel; and
        (iii) a clearance hole at the upper end of the housing allowing access to the screw driver recess in the screw but of a smaller diameter than the screw head, and an annular surface at the lower end of the housing for receiving a washer that has a clearance hole for the screw shaft such that the screw is insertable through the hole, where the lower end of the housing is rolled over to retain the washer against the housing whereby the screw is held axially in position by the housing.

11. The jack-out screw and panel of claim 10, where the panel retention means for securing the housing to the first panel is a press-in attachment means.

12. The jack-out screw and panel of claim 11, where the press-in panel attachment means includes an annular groove around the perimeter edge surface of the housing.

13. The jack-out screw and panel of claim 11, where the press-in panel attachment means includes knurling around the perimeter edge surface of the housing.

14. The jack-out screw and panel of claim 11, where the housing installs from the top of the panel.

* * * * *